United States Patent [19]
Agram et al.

[11] Patent Number: 5,330,324
[45] Date of Patent: Jul. 19, 1994

[54] ANNULAR GASKET DISPOSED AT ONE AXIAL EXTREMITY OF A ROTOR AND COVERING BLADE FEET

[75] Inventors: Daniel Agram, Melun; Jean-Louis Charbonnel, Boissise le Roi; Philippe G. E. Joly, Vaux le Penil; Gérard G. Miraucourt, Brie Comte Robert; Jacky S. Naudet, Bondoufle; Jean-Claude Prato, Cesson, all of France

[73] Assignee: Societe Nationale d'Etude et de Construction de Moteurs d'Aviation "SNECMA", Paris, France

[21] Appl. No.: 106,632

[22] Filed: Aug. 16, 1993

[30] Foreign Application Priority Data

Sep. 9, 1992 [FR] France .................. 92 10743

[51] Int. Cl.$^5$ ................................. F01D 11/00
[52] U.S. Cl. .................. 416/220 R; 416/221
[58] Field of Search ............ 416/214 R, 220 R, 221

[56] References Cited

U.S. PATENT DOCUMENTS 4,192,633 3/1980 Herzner ............... 416/220 R
4,247,257 1/1981 Benoist et al. ........... 416/221
4,846,628 7/1989 Antonellis ............. 416/220 R
5,211,407 5/1993 Glynn et al. ............ 416/220 R

FOREIGN PATENT DOCUMENTS 0286227 10/1988 European Pat. Off. .
1295003 11/1972 United Kingdom ........... 416/220 R
2006883 5/1979 United Kingdom ........... 416/220 R
2058945 4/1981 United Kingdom .
2095763 10/1982 United Kingdom ........... 416/220 R Primary Examiner—Edward K. Look
Assistant Examiner—James A. Larson
Attorney, Agent, or Firm—Oblon, Spivak, McClelland, Maier & Neustadt

[57] ABSTRACT

An annular gasket includes, at least partially conically shaped portion and is supported on a rotor via three bearing surfaces. The conical shape makes it possible to reject the center of gravity of the sections of the rotor which provokes substantial rotational movement when centrifugal forces exist and allows for an improved imperviousness via the internal and external bearings. This invention is applicable for the rotors of aircraft engines provided with axial broachings in which blade feet are able to slide.

5 Claims, 3 Drawing Sheets

ANNULAR GASKET DISPOSED AT ONE AXIAL EXTREMITY OF A ROTOR AND COVERING BLADE FEET

BACKGROUND OF THE INVENTION

1. Field of the Invention

The invention concerns an annular gasket disposed at one axial extremity of a rotor and covering broachings for receiving blade feet situated on this rotor. In particular, the invention can be used on certain turbomachines of aircraft engines.

2. Discussion of the Background

The aim of these gaskets is to limit air leaks inside the machine through the clearances in the broachings and prevent the blades from sliding into the broachings.

The particular disposition of the invention mainly makes it possible to guarantee complete imperviousness during operation and comprises three concentric bearings for keeping the gasket on the rotor, the radially internal bearing having an axial orientation opposite the broachings, the radially external bearing having an axial orientation directed externally; the bearings rest on the support surfaces of the rotor and the gasket, at least on one radially internal portion, has partially the shape of a cone opening towards the broachings.

In fact, during operation, the significant contrifugal forces combined with the conicity of the gasket exert a large moment of rotation of the sections of the gasket around the median bearing which clads the internal bearing against its support surface.

BRIEF DESCRIPTION OF THE DRAWINGS

There now follows a more detailed non-restrictive description given by way of illustration of one embodiment of the invention with reference to the accompanying drawings on which.

DESCRIPTION OF THE PREFERRED EMBODIMENTS

Figure 1:
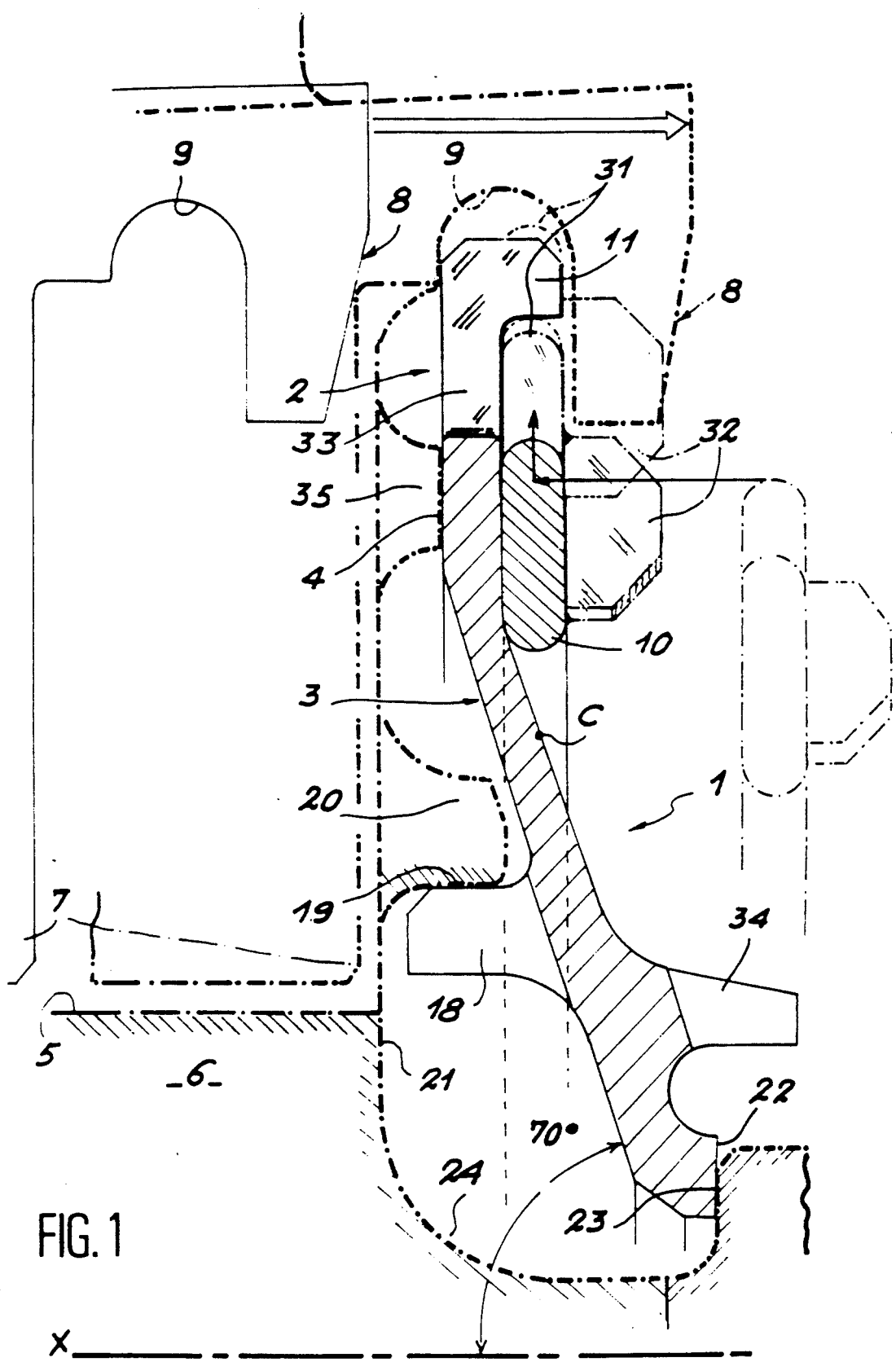
FIG. 1 shows a half-section of the gasket.
Figure 2:
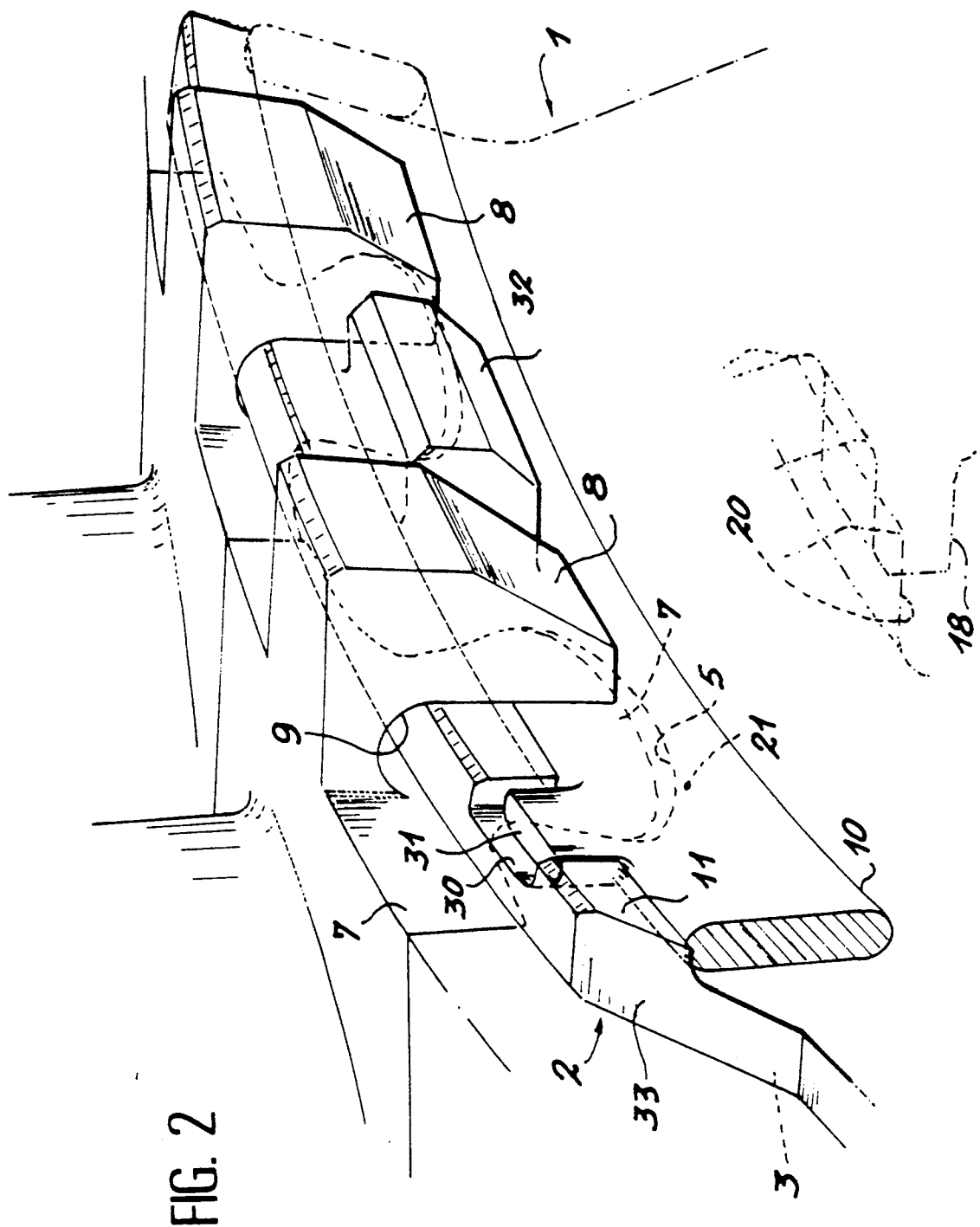
FIG. 2 shows a perspective view of the gasket.
Figure 3:
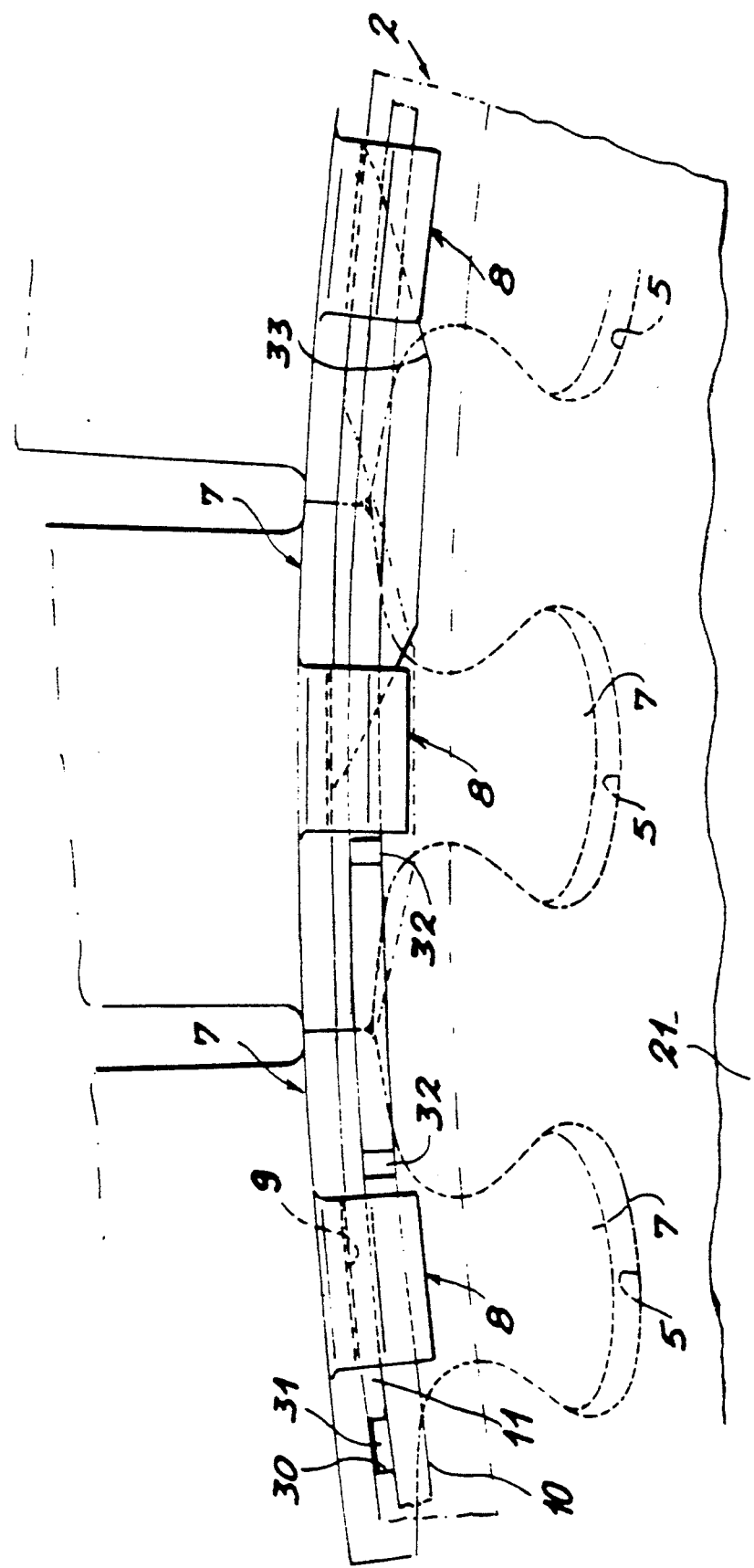
FIG. 3 shows an axial view of the rotor, these three figures being subsequently commented on indiscriminately.

The gasket bears the reference number 1. Its general shape is circular around the axis X of the rotor and annular, and it may be all of one piece or, on the other hand, be divided into a certain number of separate segments each extending over a circumference fraction. In this document, the lines are measured from the axis of the rotor. The gasket is flat as regards one radially external portion 2 and conical as regards one radially internal portion 3 considerably larger than the external portion. These two portions are annular. The external portion 2 comprises one radially external bearing 4 on one face lying in a transverse radial plane of the machine and orientated axially towards the broachings 5 which indent the circumference of the rotor 6 and are used to receive the blade feet 7 coupled to the rotor. The feet 7 are placed by making them slide axially and could escape during functioning via a similar movement. This is the reason they have been provided with a spoiler 8 on their downstream extremity face. The spoilers are orientated radially inwardly and isolate an external throat 9 occupied by the gasket 1 and a retaining ring 10. Any axial movement of the blades is then prohibited.

In accordance with a design already adopted by the applicant, the retaining ring 10 is made of an elastic material, is used to provide improved imperviousness and allows for more coherent mounting: it is jammed in an axial direction between the external portion 2 and the spoilers 8 and compressed in a radial direction by resting on a collar 11 forming the outer edge of the external portion 2 which surrounds it. The collar 11 of the gasket is located, as shown in FIG. 1, radially outwardly of the radially external bearing surface 4. Rotation of the gasket 1 and of the retaining ring is halted via the interlacings of these pieces between them and on the spoilers 8. More specifically, the gasket 1 is provided with a notch 30 through the collar 11 which occupies a notch 31 of the retaining ring 10 and the retaining ring 10 has at least one catch 32 which becomes wedged between two consecutive spoilers 8. The gasket 1 also has a notch intended for the passage of the spoilers 8. The gasket 1 is rotated so that the notch 33 is able to successively be placed in front of each spoiler 8 and move the latter forward above the gasket 1. After mounting, the notch 33 is placed between two spoilers 8. The retaining ring 10 is then compressed and slides under the spoilers 8. It then dilates so as to occupy its mounting position.

The internal portion 3 of the gasket 1 is provided on its face orientated towards the broachings 5 with blocks 18 intended to press via their external faces, which constitute a radially median bearing 19, against a circular collar 20 established on the rotor 6 and which may be continuous or, as in this case, formed of portions disposed on the teeth 21 which separate the broachings 5. Dog points 34 used to grip the gasket 1 cover the face opposite the broachings 5 of the internal portion 3. Finally, the radially internal extremity of the gasket 1 includes a third support bearing, which is an axial orientation surface parallel to the surface 4 but opposite the broachings 5. This radially internal bearing 22 rests against an opposing orientation surface 23 belonging to the rotor 6 and which delimits an internal throat 24 with other surfaces of the rotor 6.

The internal portion 3 of the gasket forms a cone opening towards the broachings 5 and whose opening half-angle with respect to the axis X of the rotor is about 70 degrees. The advantage of having an at least partially conical gasket 1 consists in that the center of gravity C of one of its sections is considerably distanced from the broachings 5. As a result, when the rotor 6 is started, the centrifugal forces, which appear and are firstly expressed by a pressure of the gasket 1 by the median bearing 19, provoke a significant moment of rotation of the sections of the gasket 1 around the median bearing 19. This moment is balanced by reaction forces exerted on the internal and external bearings 4 and 22 by the surfaces opposite the rotor. These forces are also relatively considerable with the result that the internal bearing 22 ensures good imperviousness by pressing strongly against the surface 23. Imperviousness via the outside of the gasket 1 is not provided by the external bearing 4 which only rests on separate blocks 35 situated on the teeth 21, but by the padding of the collar 11 and the retaining ring 10 in the external throats 9 and against the adjacent extremity faces of the rotor 6 and blade feet 7. The external bearing 4 does, however, offer good support for the gasket 1.

Apart from the good imperviousness and stability of the gasket which are obtained, one fundamental advantage is that no centrifugal force bears on the blades or their feet 7, which makes it possible to embody these parts as being light and made of titanium, a material which does not support frictions which would have been produced by the centrifugal forces.

What is claimed is:

1. An annular gasket disposed at one axial extremity of a rotor and covering broachings for receiving blade feet situated on the rotor and comprising:

three concentric bearing surfaces for bearing on associated surfaces on the rotor, which gasket bearing surfaces includes a radially internal sealing bearing surface orientated facing away from the broachings, a radially external bearing surface with an axial orientation orientated towards the broachings, and a radially median bearing surface radially orientated outwardly, the gasket having, at least over a radially internal portion, the shape of a cone opening axially towards the broachings, the blades having grooves formed therein and the gasket having, radially outwardly of the radially external bearing surface, a substantially circular collar which engages said grooves of the blades.

2. The annular gasket according to claim 1, wherein the cone shaped portion of the gasket has an opening half-angle of 70 degrees.

3. The annular gasket according to claim 1, wherein the gasket comprises a plurality of sectors with an angular extension equal to a fraction of a circumference.

4. The annular gasket according to claim 1 and including gripping projections on one axial orientation face opposite the broachings.

5. An annular gasket as claimed in claim 1, which comprises a retaining ring member which is engaged in said groove for providing a sealing effect.

* * * * *